March 12, 1946.  F. H. GOODING ET AL  2,396,270
BUOYANT ELECTRIC CABLE
Filed Jan. 27, 1943
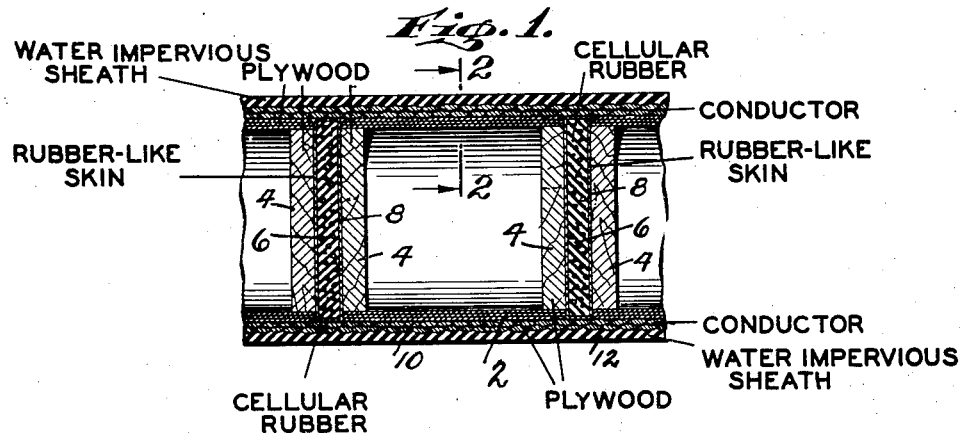
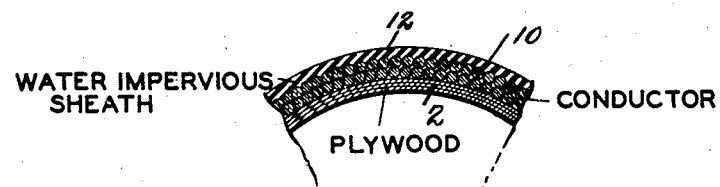
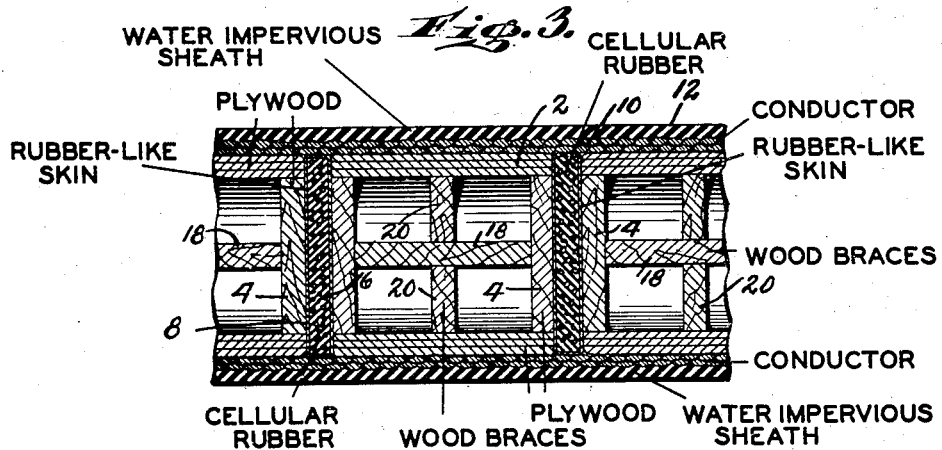
INVENTORS
Francis H. Gooding,
BY Benjamin Levinson.
James G. Bethell
ATTORNEY Patented Mar. 12, 1946

2,396,270

UNITED STATES PATENT OFFICE 2,396,270

BUOYANT ELECTRIC CABLE

Francis H. Gooding, Lodi, and Benjamin Levinson, East Paterson, N. J., assignors to The Okonite-Callender Cable Company, Incorporated, Paterson, N. J., a corporation of New Jersey Application January 27, 1943, Serial No. 473,684

7 Claims. (Cl. 174—111)

This invention relates to an improvement in buoyant cables, namely, to electric cables of the type wherein the weight to volume ratio is such as to enable the cable to float in water, sea water, for example.

One of the objects of the invention is to provide a construction which is highly resistant to water and to mechanical injury, crushing, etc.

More specifically the present invention provides a buoyant electric cable in which the conductor is stranded about a series of air tight plywood cells. Intermediate these plywood cells buoyant members, such as cellular rubber for example, are provided, these members imparting the desired flexibility to the cable.

Several embodiments of the invention have been illustrated in the accompanying drawing, in which:

Fig. 1 illustrates in sectional elevation one embodiment of the invention;

Fig. 2 is a section on the line 2—2 of Fig. 1; and

Fig. 3 is a view similar to Fig. 1 of another embodiment of the invention.

Referring to the drawing in detail and first of all to Figs. 1 and 2: 2 designates one of a plurality of plywood cylinders each of which is equipped with heads 4 of wood or of plywood cemented or otherwise held in place so that each cylinder is hermetically sealed to provide a cell. If desired each of these cells may be placed under internal pressure, say 75 to 100 pounds pressure per square inch. These cells are disposed at regular intervals along the cable and are spaced from each other by buoyant elastic spacers 6, so that the flexibility of the cable will not be impaired. The spacers 6 have been shown as of cellular rubber in which event it is desirable that each spacer be provided with a gas impervious rubber-like skin 8. It is understood, of course, that materials other than cellular rubber may be employed for the spacers. For example, the spacers may be of wood, or they may be inflated rubber cylinders.

The plywood cylinders and spacers 6 are of the same diameter, and the cable conductor, which is designated 10, is composed of wire strands laid up about this assembly of plywood cells and the spacers 6.

About the conductor 10 we apply a non-metallic water impervious flexible sheath 12 of rubber, for example, or other suitable material.

The plywood of the cylinders 2 may consist of any desired number of plies which we prefer be secured together by a suitable waterproof adhesive. The heads 4 may be either plywood or solid wood, and are cemented or otherwise so secured in place as to provide a hermetic seal.

It is preferred that the cells be impregnated and coated with any of the well known waterproofing agents.

The purpose of the skin 8, when cellular rubber spacers are employed, is to retard the escape of gas from the cells of the rubber and thus preserve the buoyancy and elasticity of the spacer.

Inasmuch as this invention is directed to electric cables which are buoyant in sea water, for example, it will be appreciated, as above set out, that the weight to volume ratio of the cable assembly will be computed accordingly.

It has been found that the plywood cells, herein disclosed, are extremely highly resistant to crushing and water absorption, and inasmuch as they are very light in weight, it will be appreciated that they are admirably suited to their function.

The embodiment of the invention illustrated in Fig. 3 is very similar to that already described, except that in Fig. 3 we reinforce the center cells with longitudinal brace 18 and transverse braces 20. These braces may be composed of solid wood or of plywood.

In both embodiments of the invention hereinabove described, it will be seen that plywood cylinders with hermetically sealed heads have been employed as the cable center. These cylinders, as pointed out, are tough and very highly resistant to crushing, which is ideal for this type of work, and may be finished in any desired manner so far as water and moisture resistance is concerned.

It is to be understood that the details of construction and arrangement of parts herein illustrated and described may be departed from without in the spirit and scope of this invention.

What we claim is:

1. In a flexible buoyant electric cable, the combination of a center comprising a plurality of hermetically sealed plywood cells, spacers intermediate adjacent cells, a conductor stranded about this assembly and an enclosing water impervious sheath, the weight to volume ratio of the cable being such as to render the cable buoyant in a medium such as sea water.

2. In a flexible buoyant electric cable, the combination of a center comprising a plurality of hermetically sealed waterproofed plywood cells, spacers intermediate adjacent cells, a conductor stranded about this assembly and an enclosing water impervious sheath, the weight to volume ratio of the cable being such as to render the cable buoyant in a medium such as sea water.

3. In a flexible buoyant electric cable, the combination of a center comprising a plurality of hermetically sealed internally braced plywood cells, spacers intermediate adjacent cells, a conductor stranded about this assembly and an enclosing water impervious sheath, the weight to volume ratio of the cable being such as to render the cable buoyant in a medium such as sea water.

4. In a flexible buoyant electric cable, the combination of a center comprising a plurality of hermetically sealed waterproofed, internally braced plywood cells, resilient spacers intermediate adjacent cells, a conductor stranded about this assembly and an enclosing water impervious sheath, the weight to volume ratio of the cable being such as to render the cable buoyant in a medium such as sea water.

5. In a flexible buoyant electric cable, the combination of a center comprising a plurality of hermetically sealed plywood cells, cellular rubber spacers intermediate adjacent cells, a conductor stranded about this assembly and an enclosing water impervious sheath, the weight to volume ratio of the cable being such as to render the cable buoyant in a medium such as sea water.

6. In a flexible buoyant electric cable, the combination of a center comprising a plurality of hermetically sealed plywood cells, cellular rubber spacers intermediate adjacent cells, a gas impervious skin or sheath surrounding each spacer, a conductor stranded about this assembly, and an enclosing water impervious sheath, the weight to volume ratio of the cable being such as to render the cable buoyant in a medium such as sea water.

7. In a flexible buoyant electric cable, the combination of a center of internally braced hermetically sealed plywood cells, spacers intermediate adjacent cells, a conductor stranded about said cells and spacers, and an outer enclosing water impervious non-metallic sheath, the weight to volume ratio of the cable being such as to render the cable buoyant in a medium such as sea water.

FRANCIS H. GOODING.
BENJAMIN LEVINSON.